United States Patent
Ozawa et al.

(10) Patent No.: US 10,068,112 B2
(45) Date of Patent: Sep. 4, 2018

(54) CARD READER

(71) Applicant: NIDEC SANKYO CORPORATION, Suwa-gun, Nagano (JP)

(72) Inventors: Shigeki Ozawa, Nagano (JP); Fumiya Akasu, Nagano (JP); Hirofumi Kuwaki, Nagano (JP); Hiroshige Takeda, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/613,840

(22) Filed: Jun. 5, 2017

(65) Prior Publication Data

US 2017/0351880 A1 Dec. 7, 2017

(30) Foreign Application Priority Data

Jun. 6, 2016 (JP) .................................. 2016-112897

(51) Int. Cl.
G06K 7/00 (2006.01)
G06K 7/08 (2006.01)
G06Q 20/34 (2012.01)

(52) U.S. Cl.
CPC ........... *G06K 7/0004* (2013.01); *G06K 7/081* (2013.01); *G06K 7/082* (2013.01); *G06Q 20/341* (2013.01)

(58) Field of Classification Search
CPC ...... G06K 7/0021; G06K 7/084; G06K 7/087; G06K 7/088

USPC ................................ 235/440, 441, 449, 493
See application file for complete search history.

(56) References Cited

U.S. PATENT DOCUMENTS

| | | | | |
|---|---|---|---|---|
| 5,404,000 A | * | 4/1995 | Nair | G06Q 20/04 235/435 |
| 6,875,105 B1 | * | 4/2005 | Behm | A63F 3/0665 235/375 |
| 8,985,447 B2 | * | 3/2015 | Ardis | G06F 21/85 235/440 |

FOREIGN PATENT DOCUMENTS

JP 2013037555 A 2/2013

* cited by examiner

*Primary Examiner* — Daniel St Cyr
(74) *Attorney, Agent, or Firm* — Cantor Colburn LLP

(57) ABSTRACT

A card reader may include a card passage; a shutter member to close the card passage; a magnetic head on a rear side of the shutter member reads or records data in a magnetic strip of a card; an electrostatic capacitance sensor on the rear side or the shutter member; a first guide member which structures at least a part of a face on a first direction side of the card passage when one side in a thickness direction of the card passing the card passage is referred to as a first direction; and a second guide member which structures at least a part of a face on a second direction side of the card passage. The first guide member may include insulating material and the second guide member may include conductive material. The electrostatic capacitance sensor may be attached to the first guide member.

18 Claims, 2 Drawing Sheets

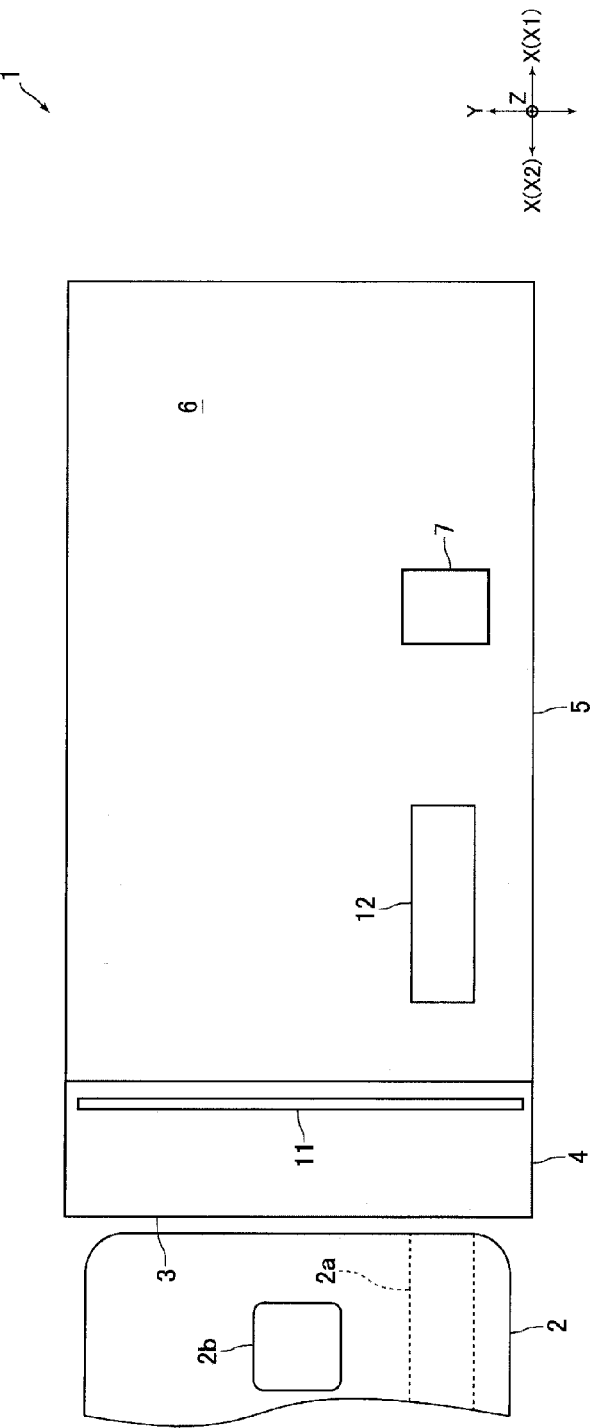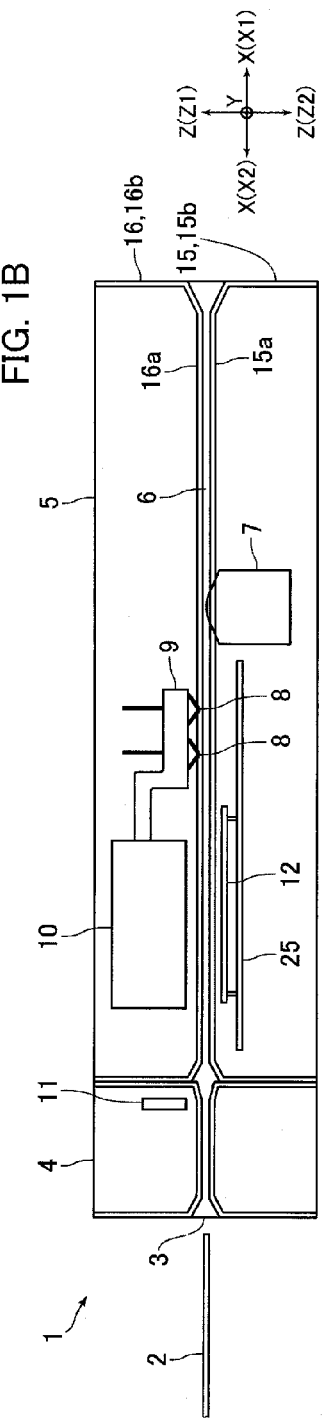

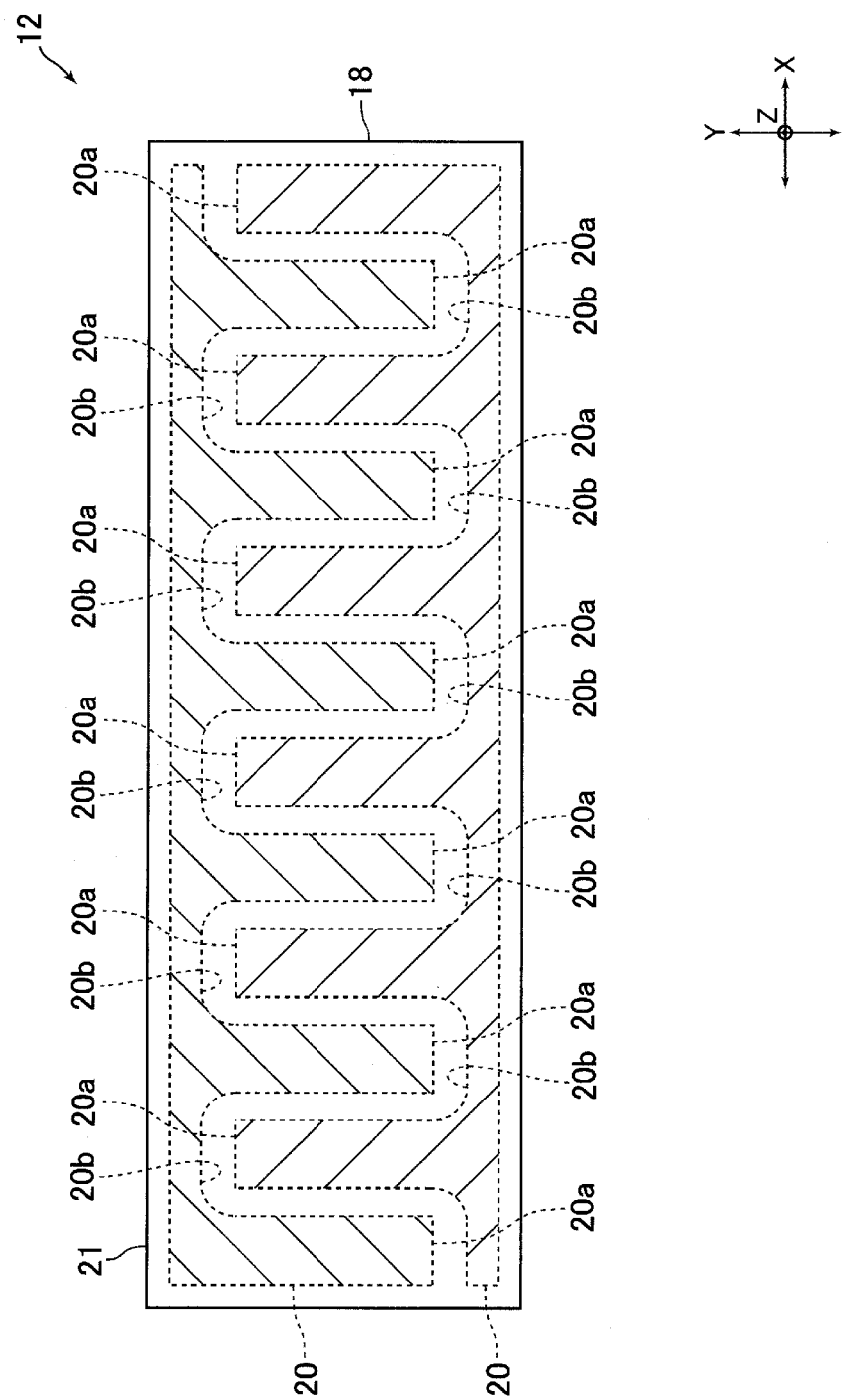

CARD READER

CROSS REFERENCE TO RELATED APPLICATION

The present invention claims priority under 35 U.S.C. § 119 to Japanese Application No. 2016-112897 filed Jun. 6, 2016, the entire content of which is incorporated herein by reference.

TECHNICAL FIELD

At least an embodiment of the present invention may relate to a card reader structured to perform reading of magnetic data recorded on a card and/or recording of magnetic data to a card.

BACKGROUND

Conventionally, a card reader structured to perform reading of magnetic data recorded on a card and/or recording of magnetic data to a card has been widely utilized. In an industry such as a financial institution where a card reader is utilized, so-called skimming, that is, a criminal attaches a magnetic head to a card insertion part of the card reader and illegally acquires magnetic data of a card, has conventionally become a large issue. Therefore, a card reader has been proposed which includes a metal sensor for detecting that a magnetic head for skimming (hereinafter, referred to as a "skimming magnetic head") has been attached to a front face side of a card insertion part (see, for example, Japanese Patent Laid-Open No. 2013-37555).

In the card reader described in the above-mentioned Patent Literature, a metal sensor is disposed in an inside of a card insertion part formed in a hollow shape. The metal sensor includes a core formed of magnetic material and a pair of excitation coils and a detection coil which are wound around the core. In the card reader, when a foreign matter including metal material is detected by the metal sensor, a predetermined abnormality processing is executed and reading of magnetic data by the skimming magnetic head attached to a front face side of the card insertion part is capable of being prevented.

A trick of skimming by a criminal has been sophisticated year by year, and a situation has occurred that a device for skimming (hereinafter, referred to as a "skimming device") such as a skimming magnetic head for reading magnetic data of a card is attached in an inside of the card reader where the skimming device has not attached conventionally. In the card reader described in the above-mentioned Patent Literature, a skimming device which is attached to a front face side of a card insertion part can be detected by the metal sensor, but a skimming device attached to an inside of the card reader cannot be detected by the metal sensor. Therefore, in the card reader, when a skimming device is attached to an inside of the card reader, reading of magnetic data by the skimming device is not prevented.

SUMMARY

In view of the problem described above, at least an embodiment of the present invention may advantageously provide a card reader capable of detecting a skimming device which is attached to an inside of the card reader.

According to at least an embodiment of the present invention, there may be provided a card reader including a card passage where a card inserted from a card insertion port is passed, a shutter member structured to be capable of closing the card passage, a magnetic head which is disposed on a rear side with respect to the shutter member and is structured to perform at least one of reading of magnetic data recorded in a magnetic stripe of the card and recording of magnetic data to the magnetic stripe, an electrostatic capacitance sensor which is disposed on the rear side with respect to the shutter member. Further, when one side in a thickness direction of the card passing the card passage is referred to as a first direction and an opposite direction to the first direction is referred to as a second direction, the card reader includes a first guide member which structures at least a part of a face on the first direction side of the card passage and a second guide member which structures at least a part of a face on the second direction side of the card passage. The first guide member is formed of insulating material and the second guide member is formed of conductive material, and the electrostatic capacitance sensor is attached to the first guide member.

In the card reader in at least an embodiment of the present invention, an electrostatic capacitance sensor is disposed on a rear side with respect to the shutter member. Therefore, according to at least an embodiment of the present invention, based on a detected result of the electrostatic capacitance sensor which is disposed on the rear side with respect to the shutter member, it can be detected that a skimming device has been attached in an inside of the card reader. Therefore, in at least an embodiment of the present invention, when it is detected that a skimming device has been attached in the inside of the card reader, reading of magnetic data by the skimming device can be prevented by executing a predetermined abnormality processing.

Further, in at least an embodiment of the present invention, the first guide member to which the electrostatic capacitance sensor is attached is formed of insulating material. Therefore, an electric coupling between the electrostatic capacitance sensor and the first guide member can be prevented and thus the entire first guide member is prevented from functioning as an electrostatic capacitance type sensor. Specifically, at least an embodiment of the electrostatic capacitance sensor is disposed between the shutter member and the magnetic head in the passing direction of the card, and that the card passage between the shutter member and the magnetic head in the passing direction of the card is structured of the first guide member and the second guide member. In this case, it may be structured that the entire face on the first direction side of the card passage is structured of the first guide member, and the entire face on the second direction side of the card passage is structured of the second guide member. According to this structure, in at least an embodiment of the present invention, based on a detected result of the electrostatic capacitance sensor, it can be appropriately detected that a skimming device has been attached in the inside of the card reader.

In addition, in at least an embodiment of the present invention, a card is passed in the card passage while contacting with the first guide member and the second guide member and thus the inside of the card reader may become a charged state. However, the second guide member is formed of conductive material and thus electricity charged in the first guide member and the second guide member when a card is passed in the card passage can be discharged through the second guide member. Specifically, it may be structured that the second guide member is electrically connected with a frame structuring the card reader and the frame is grounded. Therefore, according to at least an embodiment of the present invention, generation of static electricity can be prevented in the inside of the card reader.

In at least an embodiment of the present invention, the card reader includes, for example, an IC contact block having a plurality of IC contact springs structured to contact with an external connection terminal of an IC chip which is formed on the card to perform data communication, and a block moving mechanism structured to move the IC contact block, and the block moving mechanism is attached to a face on the second direction side of the second guide member. In this case, the electrostatic capacitance sensor can be prevented from detecting operation of the block moving mechanism by the second guide member formed of conductive material when the block moving mechanism is operated. Therefore, even when the card reader includes the block moving mechanism structured to move the IC contact block, it can be appropriately detected that a skimming device has been attached in the inside of the card reader.

In at least an embodiment of the present invention, the electrostatic capacitance sensor is attached to a face on the first direction side of the first guide member. According to this structure, a card passing the card passage can be prevented from contacting with the electrostatic capacitance sensor.

In at least an embodiment of the present invention, when a direction perpendicular to a passing direction of the card in the card passage and perpendicular to a thickness direction of the card is referred to as a width direction of the card, the electrostatic capacitance sensor is disposed in the width direction of the card at a position where the magnetic stripe is passed. In this case, it may be structured that a width of the electrostatic capacitance sensor in the width direction of the card is set to be substantially the same as a width of the magnetic stripe in the width direction of the card. According to this structure, it can be further appropriately detected that a skimming device has been attached in the inside of the card reader.

In at least an embodiment of the present invention, a color of the electrostatic capacitance sensor is the same as a color of the first guide member. According to this structure, even if the card reader is disassembled by a criminal, the criminal is hard to notice that the electrostatic capacitance sensor is attached to the first guide member.

In at least an embodiment of the present invention, when a direction perpendicular to a passing direction of the card in the card passage and perpendicular to a thickness direction of the card is referred to as a width direction of the card, the electrostatic capacitance sensor includes a detection part which is formed in a rectangular thin plate shape, and the detection part includes a pair of electrodes and is disposed so that a thickness direction of the detection part and the thickness direction of the card are coincided with each other, and that a long side direction of the detection part and the passing direction of the card are coincided with each other, and the pair of the electrodes are disposed in a separated state from each other with a predetermined space therebetween in the width direction of the card. According to this structure, it can be detected that a skimming device has been attached in an inside of the card reader over a relatively wide region in the passing direction of the card.

Further, in this case, at least an embodiment of the electrode is formed in a comb-teeth shape which is provided with a plurality of protruded parts, which are protruded to one side in the width direction of the card and are disposed at a constant pitch in the passing direction of the card, and a plurality of recessed parts which are formed between the protruded parts. Further, the protruded part of one electrode of the pair of the electrodes is entered into the recessed part of the other electrode, and the protruded part of the other electrode is entered into the recessed part of the one electrode. According to this structure, it can be detected that a skimming device has been attached in the inside of the card reader over a relatively wide region in the passing direction of a card, and it can be detected that a skimming device has been attached in the inside of the card reader in a relatively wide region in the width direction of the card.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 1A and 1B are explanatory views showing a schematic structure of a card reader in accordance with an embodiment of the present invention. FIG. 1A is a plan view and FIG. 1B is a side view.

FIG. 2 is an explanatory plan view showing a structure of an electrostatic capacitance sensor shown in FIGS. 1A and 1B.

DETAILED DESCRIPTION

An embodiment of the present invention will be described below with reference to the accompanying drawings.

(Structure of Card Reader)

FIGS. 1A and 1B are explanatory views showing a schematic structure of a card reader 1 in accordance with an embodiment of the present invention. FIG. 1A is a plan view and FIG. 1B is a side view. FIG. 2 is an explanatory plan view showing a structure of an electrostatic capacitance sensor 12 shown in FIGS. 1A and 1B.

A card reader 1 in this embodiment is a device which is structured to perform at least one of reading of magnetic data recorded on a card 2 and recording of magnetic data to the card 2. For example, the card reader 1 is mounted on and used in a host apparatus such as an ATM (Automated Teller Machine). A card 2 is, for example, a rectangular card made of vinyl chloride whose thickness is about 0.7-0.8 mm. A rear face of the card 2 is formed with a magnetic stripe 2a in which magnetic data are recorded. Further, an IC chip is incorporated into the card 2 and a front face of the card 2 is formed with an external connection terminal 2b of the IC chip.

The card reader 1 includes a card insertion part 4 which is formed with an insertion port 3 into which a card 2 is inserted, and a main body part 5 to which the card insertion part 4 is fixed. An inside of the card reader 1 is formed with a card passage 6 where a card 2 inserted from the insertion port 3 is passed. Further, drive rollers (not shown) and pad rollers (not shown) for conveying a card 2 are disposed in the inside of the card reader 1. A card 2 inserted from the insertion port 3 is conveyed in the card passage 6.

In this embodiment, a card 2 is conveyed and passed in the "X" direction shown in FIGS. 1A and 1B and the like. In other words, the "X" direction is a passing direction of a card 2 in the card passage 6. Specifically, a card 2 is inserted to the "X1" direction and the card 2 is ejected to the "X2" direction. Further, the "Z" direction in FIGS. 1A and 1B and the like perpendicular to the "X" direction is a thickness direction of the card 2 passing along the card passage 6, and the "Y" direction in FIGS. 1A and 1B and the like perpendicular to the "X" direction and the "Z" direction is a width direction (short width direction) of the card 2 passing along the card passage 6.

In the following descriptions, the "X" direction is referred to as a front and rear direction, the "Y" direction is referred to as a right and left direction, and the "Z" direction is referred to as an upper and lower direction. Further, an "X1" direction side in the front and rear direction is referred to as a "rear (back)" side, an "X2" direction side which is the opposite side is referred to as a "front" side, a "Z1" direction side in the upper and lower direction is referred to as an "upper" side, and a "Z2" direction side which is the opposite side is referred to as a "lower" side. The card insertion part 4 is attached to a front end face of the main body part 5. In this embodiment, the "Z2" direction (lower direction) is a first direction which is one side in the thickness direction of a card 2, and the "Z1" direction (upper direction) is a second direction which is an opposite direction to the first direction.

The card reader 1 includes a magnetic head 7 structured to perform at least one of reading of magnetic data recorded in a magnetic stripe 2a and recording of magnetic data to the magnetic stripe 2a, an IC contact block 9 having a plurality of IC contact springs 8 structured to contact with an external connection terminal 2b and perform data communication, a block moving mechanism 10 structured to move the IC contact block 9, a shutter member 11 structured to be capable of closing the card passage 6, and an electrostatic capacitance sensor 12 structured to detect that a foreign matter has been attached to the card passage 6. In FIG. 1A, the IC contact block 9 and the block moving mechanism 10 are not shown.

In addition, the card reader 1 includes a guide member 15 as a first guide member which structures a lower side face (lower face) of the card passage 6 in the main body part 5, and a guide member 16 as a second guide member which structures an upper side face (upper face) of the card passage 6 in the main body part 5. The card passage 6 is formed between the guide member 15 and the guide member 16 in the upper and lower direction.

The guide member 15 is formed of insulating material (non-conductive material). Specifically, the guide member 15 is formed of resin material having insulation property. A color of the guide member 15 is black. The guide member 15 is provided with an upper face part 15a which structures the whole of an under face of the card passage 6. The upper face part 15a is formed in a substantially rectangular flat plate shape which is long and thin in the front and rear direction. Further, the guide member 15 is provided with a side wall part 15b which is formed and extended to a lower side from end faces on the front and rear sides and from end faces on the right and left sides of the upper face part 15a. In accordance with an embodiment of the present invention, the upper face part 15a may structure a part of the under face of the card passage 6.

The guide member 16 is formed of conductive material. Specifically, the guide member 16 is formed of conductive resin material which contains a conductive filler. A color of the guide member 16 is black similarly to the guide member 15. The guide member 16 is provided with an under face part 16a structuring the whole of an upper face of the card passage 6. The under face part 16a is formed in a substantially rectangular flat plate shape which is long and thin in the front and rear direction. Further, the guide member 16 is provided with a side wall part 16b which is formed and extended to an upper side from end faces on the front and rear sides and from end faces on the right and left sides of the under face part 16a. The guide member 16 is electrically connected with a metal frame (not shown) of the card reader 1 and the frame is grounded. Therefore, the guide member 16 is also grounded through the frame. In accordance with an embodiment of the present invention, the under face part 16a may structure a part of an upper face of the card passage 6.

The shutter member 11 is disposed in a rear end side portion of the card insertion part 4. The shutter member 11 is connected with a shutter drive mechanism not shown and the shutter member 11 is movable between a closing position where the card passage 6 is closed and an open position where the shutter member 11 is retreated from the card passage 6 to open the card passage 6. The shutter drive mechanism is disposed to an upper side of the card passage 6. Further, the shutter member 11 located at an open position is disposed to an upper side of the card passage 6. In accordance with an embodiment of the present invention, the shutter member 11 may be disposed in a boundary portion between the card insertion part 4 and the main body part 5.

The magnetic head 7 is disposed in an inside of the main body part 5 and is disposed on a rear side with respect to the shutter member 11. The magnetic head 7 is attached to the guide member 15 so that a gap part of the magnetic head 7 faces the card passage 6 from a lower side. The upper face part 15a of the guide member 15 is formed with an opening part (not shown) so as to penetrate through the upper face part 15a in the upper and lower direction and an upper end side portion of the magnetic head 7 is disposed in the opening part. Further, the magnetic head 7 is disposed at a position in the right and left direction where a magnetic stripe 2a of a card 2 inserted from the insertion port 3 is passed.

An IC contact block 9 and the block moving mechanism 10 are disposed in the inside of the main body part 5 and are disposed on a rear side with respect to the shutter member 11. The IC contact block 9 is attached to the guide member 16. The block moving mechanism 10 is also attached to the guide member 16. Specifically, the block moving mechanism 10 is attached to an upper face of the under face part 16a. In other words, the block moving mechanism 10 is attached to an upper side face of the guide member 16. In this embodiment, the block moving mechanism 10 is disposed to a front side of the IC contact block 9.

The block moving mechanism 10 includes, for example, a solenoid which is a drive source and a link mechanism which transmits power of the solenoid to the IC contact block 9. The block moving mechanism 10 moves the IC contact block 9 between a position where lower end parts of the IC contact springs 8 are disposed in the card passage 6 so that the IC contact springs 8 are capable of contacting with an external connection terminal 2b of a card 2 and a position where the IC contact springs 8 are retreated to an upper side of the card passage 6. The under face part 16a of the guide member 16 is formed with an opening part (not shown) so as to penetrate through the under face part 16a in the upper and lower direction and the IC contact springs 8 are capable of passing the opening part. In this embodiment, the entire card passage 6 is formed of the guide member 15 and the guide member 16. However, the card passage 6 which is located on an upper side of the electrostatic capacitance sensor 12 and is located on a lower side of the IC contact block 9 and the block moving mechanism 10, in other words, only the card passage 6 between the magnetic head 7 and the shutter member 11 may be structured of the guide member 15 and the guide member 16.

The electrostatic capacitance sensor 12 is a thin film-shaped sensor and is structured to detect a foreign matter based on a variation of electrostatic capacitance. The electrostatic capacitance sensor 12 is disposed in the inside of the main body part 5 and is disposed on a rear side with respect to the shutter member 11. In this embodiment, the electrostatic capacitance sensor 12 is disposed between the magnetic head 7 and the shutter member 11 in the front and rear direction.

The electrostatic capacitance sensor 12 is, for example, formed in a rectangular thin plate shape (sheet shape). The electrostatic capacitance sensor 12 is attached to the guide member 15. Specifically, the electrostatic capacitance sensor 12 is fixed to an under face of the upper face part 15a so that a thickness direction of the electrostatic capacitance sensor 12 and the upper and lower direction are coincided with each other and that a long side direction of the electrostatic capacitance sensor 12 and the front and rear direction are coincided with each other. In other words, the electrostatic capacitance sensor 12 is attached to a lower side face of the guide member 15 and is disposed on a lower side with respect to the card passage 6. Further, the electrostatic capacitance sensor 12 is disposed at a position in the right and left direction where a magnetic stripe 2a of a card 2 inserted from the insertion port 3 is passed. In addition, the electrostatic capacitance sensor 12 is disposed to a lower side of the block moving mechanism 10.

The electrostatic capacitance sensor 12 includes a detection part 18 (see FIG. 2) and a protection film covering the detection part 18. A color of the protection film is black and a color of the electrostatic capacitance sensor 12 is black. In other words, the color of the electrostatic capacitance sensor 12 is the same as the color of the guide member 15. The detection part 18 is, as a whole, formed in a rectangular thin plate shape and is disposed so that a thickness direction of the detection part 18 and the upper and lower direction are coincided with each other and that a long side direction of the detection part 18 and the front and rear direction are coincided with each other. Therefore, a detection surface of the detection part 18 is disposed so as to be parallel to the card passage 6.

The detection part 18 includes a pair of electrodes 20 and a circuit board 21 on which the electrodes 20 are mounted. The electrode 20 is provided with a plurality of protruded parts 20a which are protruded to one side in the right and left direction and are disposed at a constant pitch in the front and rear direction and a plurality of recessed parts 20b which are formed between the protruded parts 20a. In other words, the electrode 20 is formed in a comb-teeth shape. The pair of the electrodes 20 is disposed in a state that a predetermined space is provided therebetween in the right and left direction. Further, the protruded parts 20a of one of the pair of the electrodes 20 are entered into the recessed parts 20b of the other of the pair of the electrodes 20, and the protruded parts 20a of the other electrode 20 are entered into the recessed parts 20b of the one electrode 20.

The electrostatic capacitance sensor 12 is mounted on a circuit board 25 and terminals of the electrostatic capacitance sensor 12 are directly connected with the circuit board 25. The circuit board 25 is a rigid circuit board such as a glass-epoxy board and is fixed to an under face side of the guide member 15. Further, the circuit board 25 is disposed to a lower side of the electrostatic capacitance sensor 12. The circuit board 25 is mounted with a CPU which is structured to process an output signal of the electrostatic capacitance sensor 12. The circuit board 25 outputs a digital signal created in the CPU based on the output signal of the electrostatic capacitance sensor 12. In accordance with an embodiment of the present invention, the electrostatic capacitance sensor 12 may be connected with the circuit board 25 through a coaxial cable.

In a case that a level of an output signal of the electrostatic capacitance sensor 12 in a standby state of the card reader 1 when a card 2 is not inserted into the card reader 1 is referred to as a standby signal level, for example, a control part of the card reader 1 stores a standby signal level and, when a state that a variation amount of an output signal level with respect to the standby signal level of the electrostatic capacitance sensor 12 becomes a predetermined threshold value or more continues for a predetermined time period or more, the control part of the card reader 1 determines that a foreign matter such as a skimming device has been attached to the card passage 6. For example, when a state that a variation amount of an output signal level of the electrostatic capacitance sensor 12 with respect to a standby signal level becomes a predetermined threshold value or more continues longer than a processing time for a card 2 in the card reader 1 (specifically, continues longer than a normal processing time for a normal card 2 in the card reader 1), the control part of the card reader 1 determines that a foreign matter such as a skimming device has been attached to the card passage 6.

Further, when the control part determines that a foreign matter has been attached to the card passage 6, a predetermined abnormality processing such as a notification of a predetermined alarm to a host apparatus is executed. Further, in a state that the control part determines that a foreign matter is not attached to the card passage 6, when a card 2 is inserted into the insertion port 3, the control part drives the shutter drive mechanism to move the shutter member 11 located at a closing position to an open position.

In this embodiment, when a card 2 is inserted from the insertion port 3 and is moved along the card passage 6, the electrostatic capacitance sensor 12 detects the card 2 and an output signal level of the electrostatic capacitance sensor 12 is varied. A variation amount of the output signal level is substantially constant. Therefore, the threshold value which is compared with a variation amount of the output signal level of the electrostatic capacitance sensor 12 with respect to the standby signal level is set on the basis of a variation amount of an output signal level of the electrostatic capacitance sensor 12 when the electrostatic capacitance sensor 12 has detected a card 2 and, in addition, so as not to erroneously detect a foreign matter having been attached to the card passage 6.

Principal Effects in this Embodiment

As described above, in this embodiment, the electrostatic capacitance sensor 12 is disposed on a rear side with respect to the shutter member 11 and is disposed at a position in the right and left direction where a magnetic stripe 2a of a card 2 is passed. Therefore, according to this embodiment, based on a detected result of the electrostatic capacitance sensor 12 which is disposed on a rear side with respect to the shutter member 11, it can be detected that a skimming device has been attached in an inside of the card reader 1 (specifically, in an inside of the main body part 5). Further, in this embodiment, when a control part of the card reader 1 detects that a skimming device has been attached in the inside of the main body part 5, a predetermined abnormality processing is executed, for example, a predetermined alarm is notified to its host apparatus. Therefore, according to this embodiment, even if a skimming device is attached in the inside of the main body part 5, reading of magnetic data by the skimming device can be prevented.

In this embodiment, the guide member 15 to which the electrostatic capacitance sensor 12 is attached is formed of insulating material. Therefore, according to this embodiment, electric coupling between the electrostatic capacitance sensor 12 and the guide member 15 is prevented and thereby the entire guide member 15 can be prevented from functioning as an electrostatic capacitance type sensor. Accordingly, in this embodiment, based on a detected result of the electrostatic capacitance sensor 12, it can be appropriately detected that a skimming device has been attached in the inside of the main body part 5.

In this embodiment, a card 2 is passed along the card passage 6 while contacting with the guide members 15 and 16 and thus, an inside of the card reader 1 may become a charged state. However, in this embodiment, the guide member 16 is formed of conductive material. Further, the guide member 16 is electrically connected with a metal frame of the card reader 1 and the frame is grounded. Therefore, according to this embodiment, electricity charged in the guide members 15 and 16 when a card 2 is passed along the card passage 6 can be discharged through the guide member 16. Accordingly, in this embodiment, generation of static electricity can be prevented in the inside of the card reader 1.

Further, in this embodiment, the block moving mechanism 10 is disposed to an upper side of the electrostatic capacitance sensor 12. However, the block moving mechanism 10 is attached to an upper side face of the guide member 16 which is formed of conductive material. Therefore, according to this embodiment, when the block moving mechanism 10 is operated, the electrostatic capacitance sensor 12 can be prevented from detecting the operation of the block moving mechanism 10 by the guide member 16. Accordingly, in this embodiment, even when the block moving mechanism 10 is disposed to an upper side of the electrostatic capacitance sensor 12, it can be appropriately detected that a skimming device has been attached in the inside of the main body part 5.

In this embodiment, the electrostatic capacitance sensor 12 is attached to an under face of the guide member 15 so that the guide member 15 is disposed between the electrostatic capacitance sensor 12 and the card passage 6. Therefore, according to this embodiment, a card 2 passing along the card passage 6 can be prevented from contacting with the electrostatic capacitance sensor 12. Further, in this embodiment, the color of the electrostatic capacitance sensor 12 is set to be the same as the color of the guide member 15. Therefore, even if the card reader 1 is disassembled by a criminal, the criminal is hard to notice that the electrostatic capacitance sensor 12 is attached to the guide member 15.

In this embodiment, the detection part 18 formed in a rectangular thin plate shape is disposed so that a thickness direction of the detection part 18 and the upper and lower direction are coincided with each other and that a long side direction of the detection part 18 and the front and rear direction are coincided with each other. Therefore, according to this embodiment, it can be detected that a skimming device has been attached in the inside of the main body part 5 over a relatively wide region in the front and rear direction. Further, a skimming device must be disposed at a position where a magnetic stripe 2a of a card 2 is passed and thus a width in the right and left direction of the electrostatic capacitance sensor 12 provided with the detection part 18 may be, as shown in FIG. 1A, set in substantially the same width as a width of the stripe 2a. Therefore, the electrostatic capacitance sensor 12 can be provided in a wide region in the front and rear direction. In this case, it may be structured that a width in the right and left direction of the detection part 18 is set to be substantially the same as the width of the stripe 2a and a width of the electrostatic capacitance sensor 12 is larger than the width of the stripe 2a. Further, in this embodiment, the electrode 20 is provided with a plurality of the protruded parts 20a disposed at a constant pitch in the front and rear direction and a plurality of the recessed parts 20b formed between the protruded parts 20a. In addition, the protruded part 20a of one of a pair of the electrodes 20 is entered into the recessed part 20b of the other of the pair of the electrodes 20, and the protruded part 20a of the other of the pair of the electrodes 20 is entered into the recessed part 20b of the one of the pair of the electrodes 20. Therefore, it can be detected that a skimming device has been attached in the inside of the main body part 5 over a relatively wide region in the right and left direction.

Other Embodiments

Although the present invention has been shown and described with reference to a specific embodiment, various changes and modifications will be apparent to those skilled in the art from the teachings herein.

In the embodiment described above, the electrostatic capacitance sensor 12 is disposed between the magnetic head 7 and the shutter member 11. However, the electrostatic capacitance sensor 12 may be disposed on a rear side with respect to the magnetic head 7. Further, in the embodiment described above, the electrostatic capacitance sensor 12 is attached to an under face of the upper face part 15a of the guide member 15. However, in a case that a card 2 can be moved along the card passage 6 without hindrance, the electrostatic capacitance sensor 12 may be attached to an upper face of the upper face part 15a. Further, in the embodiment described above, in a case that a card 2 can be moved along the card passage 6 without hindrance, an opening part penetrating in the upper and lower direction may be formed in the upper face part 15a so that the electrostatic capacitance sensor 12 is exposed to the card passage 6.

In the embodiment described above, in a case that an IC chip is not incorporated in a card 2, the card reader 1 is not required to provide with the IC contact block 9 and the block moving mechanism 10. In this case, the electrostatic capacitance sensor 12 may be attached to the under face part 16a of the guide member 16. In a case that the electrostatic capacitance sensor 12 is attached to the under face part 16a, the guide member 16 is formed of insulating material and the guide member 15 is formed of conductive material. In this case, the guide member 16 is the first guide member and the guide member 15 is the second guide member.

In the embodiment described above, the color of the electrostatic capacitance sensor 12 is black. However, the color of the electrostatic capacitance sensor 12 may be a color other than black. Further, in the embodiment described above, the electrode 20 is formed with a plurality of the protruded parts 20a and a plurality of the recessed parts 20b. However, no protruded part 20a and no recessed part 20b may be formed in the electrode 20. In other words, the electrode 20 may be formed in a rectangular shape which is long and thin in the front and rear direction. Further, in the embodiment described above, the card 2 is a rectangular card made of vinyl chloride whose thickness is about 0.7-0.8 mm. However, the card 2 may be a PET (polyethylene terephthalate) card whose thickness is about 0.18-0.36 mm or may be a paper card having a predetermined thickness.

In the embodiment described above, the card reader 1 is a card conveyance type card reader including drive rollers and pad rollers. However, a card reader to which at least an embodiment of the present invention is applied may be a manual type card reader structured to perform reading and/or recording of magnetic data while a card 2 is manually moved by a user. For example, a card reader to which at least an embodiment of the present invention is applied may be a so-called dip-type card reader structured to perform reading and/or recording of magnetic data when a card 2 is inserted into the card reader or when a card 2 is pulled out from the card reader.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for use with a card having a magnetic stripe, the card reader comprising:
   a card passage where the card inserted from a card insertion port is passed;
   a shutter member structured to close the card passage;
   a magnetic head which is disposed on a rear side with respect to the shutter member and is structured to perform at least one of reading of magnetic data recorded in the magnetic stripe of the card and recording of magnetic data to the magnetic stripe;
   an electrostatic capacitance sensor which is disposed on the rear side with respect to the shutter member;
   a first guide member which structures at least a part of a face on a first direction side of the card passage when one side in a thickness direction of the card passing the card passage is referred to as a first direction; and
   a second guide member which structures at least a part of a face on a second direction side of the card passage when an opposite direction to the first direction is referred to as a second direction;
   wherein the first guide member comprises insulating material and the second guide member comprises conductive material; and
   wherein the electrostatic capacitance sensor is attached to the first guide member.

2. The card reader according to claim 1, further comprising:
   an IC contact block comprising a plurality of IC contact springs structured to contact with an external connection terminal of an IC chip which is formed on the card to perform data communication; and
   a block moving mechanism structured to move the IC contact block,
   wherein the block moving mechanism is attached to a face on the second direction side of the second guide member.

3. The card reader according to claim 2, wherein the electrostatic capacitance sensor is attached to a face on the first direction side of the first guide member.

4. The card reader according to claim 3, wherein
   when a direction perpendicular to a passing direction of the card in the card passage and a thickness direction of the card is referred to as a width direction of the card,
   the electrostatic capacitance sensor is disposed at a position where the magnetic stripe is passed in the width direction of the card.

5. The card reader according to claim 4, wherein a color of the electrostatic capacitance sensor is the same as a color of the first guide member.

6. The card reader according to claim 1, wherein
   when a direction perpendicular to a passing direction of the card in the card passage and a thickness direction of the card is referred to as a width direction of the card,
   the electrostatic capacitance sensor comprises a detection part which is formed in a rectangular thin plate shape,
   the detection part comprises a pair of electrodes and is disposed so that a thickness direction of the detection part and a thickness direction of the card are coincided with each other, and that a long side direction of the detection part and the passing direction of the card are coincided with each other, and
   the pair of the electrodes are disposed in a separated state from each other with a predetermined space therebetween in the width direction of the card.

7. The card reader according to claim 6, wherein the electrode is formed in a comb-teeth shape and comprises:
   a plurality of protruded parts which are protruded to one side in the width direction of the card and are disposed at a constant pitch in the passing direction of the card; and
   a plurality of recessed parts which are formed between the protruded parts,
   the protruded part of one electrode of the pair of the electrodes is entered into the recessed part of the other electrode, and
   the protruded part of the other electrode is entered into the recessed part of the one electrode.

8. The card reader according to claim 7, wherein
   when a direction perpendicular to a passing direction of the card in the card passage and a thickness direction of the card is referred to as a width direction of the card,
   the detection part of the electrostatic capacitance sensor is disposed at a position where the magnetic stripe is passed in the width direction of the card.

9. The card reader according to claim 8, wherein
   the electrostatic capacitance sensor is disposed between the shutter member and the magnetic head in the passing direction of the card, and
   the card passage between the shutter member and the magnetic head in the passing direction of the card is structured of the first guide member and the second guide member.

10. The card reader according to claim 9, wherein
    a whole of the face on the first direction side of the card passage is structured of the first guide member, and
    a whole of the face on the second direction side of the card passage is structured of the second guide member.

11. The card reader according to claim 9, wherein
    the second guide member is electrically connected with a frame structuring the card reader, and
    the frame is grounded.

12. The card reader according to claim 8, wherein a width of the electrostatic capacitance sensor in the width direction of the card is set to be substantially the same as a width of the magnetic stripe in the width direction of the card.

13. The card reader according to claim 1, wherein
when a direction perpendicular to a passing direction of the card in the card passage and a thickness direction of the card is referred to as a width direction of the card,
the electrostatic capacitance sensor is disposed at a position where the magnetic stripe is passed in the width direction of the card.

14. The card reader according to claim 13, further comprising:
an IC contact block comprising a plurality of IC contact springs structured to contact with an external connection terminal of an IC chip which is formed on the card to perform data communication; and
a block moving mechanism structured to move the IC contact block,
wherein the block moving mechanism is attached to the second direction side of the second guide member.

15. The card reader according to claim 14, wherein
the second guide member is electrically connected with a frame structuring the card reader, and
the frame is grounded.

16. The card reader according to claim 13, wherein
the electrostatic capacitance sensor is disposed between the shutter member and the magnetic head in the passing direction of the card, and
the card passage between the shutter member and the magnetic head in the passing direction of the card is structured of the first guide member and the second guide member.

17. The card reader according to claim 16, wherein
a whole of the face on the first direction side of the card passage is structured of the first guide member, and
a whole of the face on the second direction side of the card passage is structured of the second guide member.

18. The card reader according to claim 16, wherein a width of the electrostatic capacitance sensor in the width direction of the card is set to be substantially the same as a width of the magnetic stripe in the width direction of the card.

* * * * *